Sept. 28, 1926.
W. G. CORSON
1,601,681
MACHINE FOR MAKING AND FORMING GROMMETS AND THE LIKE
Filed July 9. 1925    2 Sheets-Sheet 1
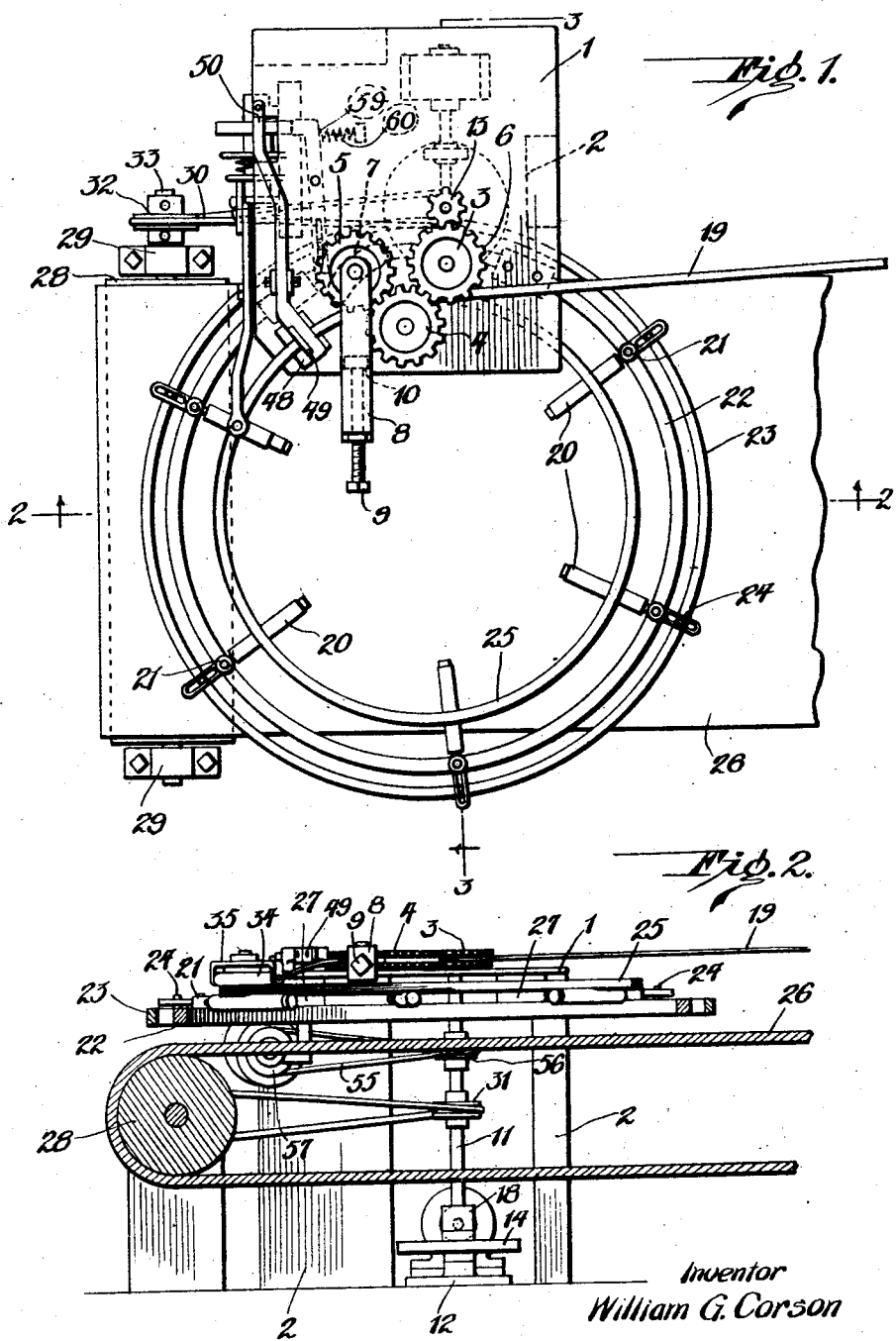
Inventor
William G. Corson
By Harold S. Huggins
Attorney Sept. 28, 1926.  
W. G. CORSON  
1,601,681  
MACHINE FOR MAKING AND FORMING GROMMETS AND THE LIKE  
Filed July 9, 1925    2 Sheets-Sheet 2

Inventor  
William G Corson  
By Harold S. Huggins  
Attorney

Patented Sept. 28, 1926.

1,601,681

UNITED STATES PATENT OFFICE.

WILLIAM G. CORSON, OF AKRON, OHIO, ASSIGNOR TO THE NATIONAL STANDARD COMPANY, OF NILES, MICHIGAN, A CORPORATION OF MICHIGAN.

MACHINE FOR MAKING AND FORMING GROMMETS AND THE LIKE.

Application filed July 9, 1925. Serial No. 42,613.

This invention relates to a machine for making and forming grommets or other forms of laminated rings.

An object of the invention resides in providing a machine adapted to make grommets or form rings from strip material by uniformly bending the strip material to form the ring or grommet which may contain several convolutions of the strip material in the completed article.

Another object of the invention resides in providing a machine which will produce laminated grommets or rings of any desired size with means for controlling the amount of strip material formed into each grommet in order to make all grommets of substantially uniform size and section.

A further object of the invention resides in providing a machine of the above mentioned character in which the controlling mechanisms are all adjustable so that the section, size, and number of convolutions in a ring may be governed within predetermined limits.

The invention comprehends other objects and improvements in the details of construction and arrangement of the parts which are more particularly pointed out in the following detailed description and in the claims directed to a preferred form of the invention, it being understood, however, that various changes may be made in the construction of the parts of the machine without departing from the scope of the invention as herein set forth.

In the drawings forming part of this application:—

Fig. 1 is a plan view of the improved machine,

Fig. 2 is a sectional view taken on line 2—2 of Fig. 1,

Figure 3:
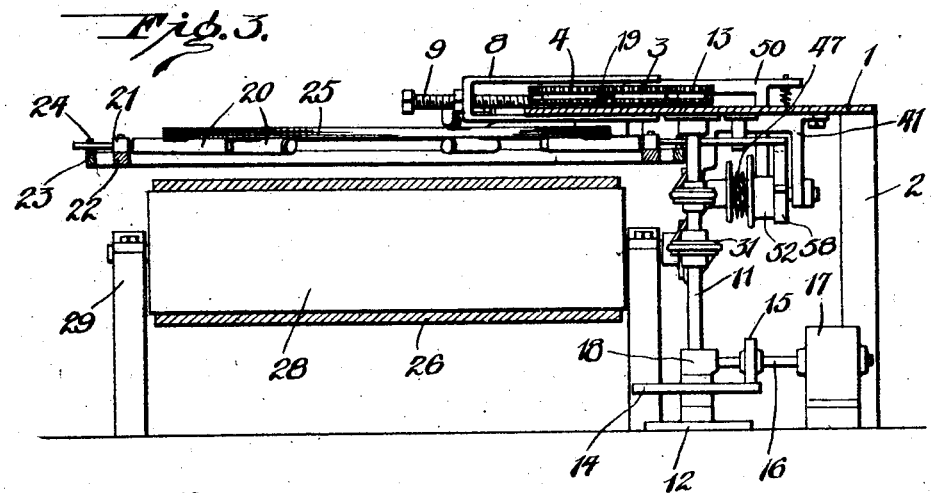
Fig. 3 is a sectional view taken on line 3—3 of Fig. 1.
Figure 4:
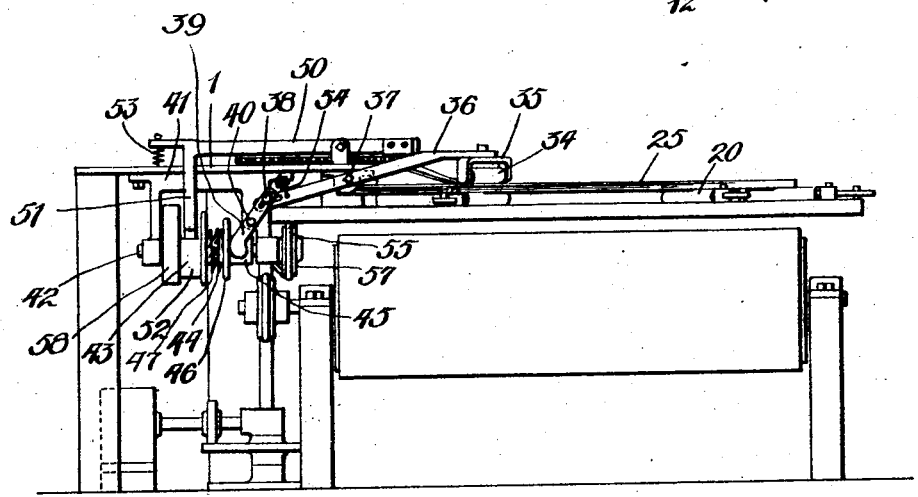
Fig. 4 is an end elevation of the machine.
Figure 5:
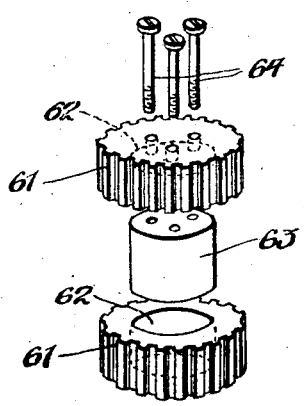
Fig. 5 is a disassembled perspective view of one of the bending rollers.

1 indicates a table suitably supported on uprights 2 on the upper face of which is mounted a plurality of flanged rollers 3, 4 and 5, respectively. The flanges of the rollers are provided with gear teeth intermeshing with the gear teeth of one of the other rollers as indicated at 6. The table is formed with an arcuate slot 7 concentric with the axis of rotation of roller 4 so that the roller 5 may be adjusted relative to rollers 3 and 4 for purposes hereinafter set forth. A U-shape adjusting member 8 forms a bearing member for the roller 5 for adjusting the roller in the slot through the operation of the adjusting screw 9 threaded in the bridge portion of the member 8 and journaled in the lug 10 on the table. A shaft 11 is journaled in the table at the upper end and in the bearing 12 at the lower end and is provided with a drive gear 13 meshing with the teeth on roller 3 for driving all of the rollers in the rotation of the shaft. A friction disk 14 is mounted on the shaft 11 adjacent the lower end and with which engages the friction roller 15 mounted on the drive shaft 16 of the motor 17. The end of this drive shaft 16 is journaled in the bearing block 18 also rotatably receiving the shaft 11.

A strip of material 19 to be formed is received between roller 4 and rollers 3 and 5, as shown in Fig. 1, and in the rotation of the rollers by the motor through the mechanism above described the strip will be drawn through the rollers and simultaneously bent to the curvature of the desired size of ring according to the set of roller 5 relative to the other rollers.

As the strip leaves the rollers it is discharged upon the ring supporting rolls 20. The rolls 20 are rotatably mounted on the brackets 21 pivotally connected at spaced intervals to the annular support 22. An operating ring 23 is provided with a pin and slot connection 24 with the brackets 21 for swinging the brackets on their pivots and move the rolls 20 so that the completed ring 25 may be dropped from the rolls on to the conveyor belt 26 for delivery to a suitable place.

The annular support 22 is mounted on the table 1 by being suitably secured to the blocks 27 carried by the bottom side of the table. The conveyor belt 26 passes over the drive roller 28 journaled in bearings 29 and which is driven by the belt 30 from the pulley 31 on shaft 11 passing over pulley 32 carried by the roller shaft 33.

In the making of a ring 25 with this machine several turns or convolutions of the strip are formed and built one upon the other as illustrated. For constructing rings of uniform size and section a gauging mechanism is provided for controlling the operation of suitable cutting mechanism for severing the strip and to complete the formation of the ring. This gauging mechanism includes a gauging roller 34 rotatable in the bracket 35 carried by the arm 36. The arm 36 is pivotally mounted on the table at 37 and at the other end is provided with an adjustable pivot connection 38 with the clutch operating lever 39, pivotally mounted intermediate the ends at 40 on the shaft carrying bracket 41. A shaft 42 is rotatable in the bearings of the bracket 41 on which is freely and rotatably mounted the cutter and ring operating cam member 43 which has clutch member of suitable form at 44. A sliding collar 45 carries a cooperating clutch member of suitable form at 46 and is slidably mounted on shaft 42 for rotation therewith, the spring 47 normally retaining collar 45 and its carried clutch member 46 in disengaged relation with respect to clutch member 44.

A stationary cutter plate 48 is mounted on the table 1 with which cooperates the movable cutter bar 49 carried by the cutter bar operating lever 50 pivotally mounted on the table intermediate its ends and having a depending extension 51 engaging the surface of the cutter operating cam 52 of cam member 43. A coil spring 53 normally tensioned is connected to the end of lever 50 and the table and normally holds the cutter bar operating lever in raised position. A coil spring 54 operates lever 36 for normally retaining the roller 34 in engagement with the top coil of the ring 25.

The above described structure operates so that when the desired section of the ring is built up by the coiling of the convolutions of the strip member into the ring, the roller 34 will be raised as the section of the ring is built up and at the proper time move the clutch collar 45 sufficiently to engage clutch member 46 with clutch member 44 which will rotate the cam 52 and operate the cutter bar operating lever to operate the cutter and sever the strip, completing the formation of a ring 25 of desired shape and section.

The shaft 42 is rotated by a suitable belt 55 trained over the pulleys 56 and 57 on the shafts 11 and 42, respectively.

The cam 58 of the cam member 43 operates lever 59 pivotally mounted under table 1 and which has a pin and slot connection with the ring 23 following the operation of the cutter bar for rotating the ring 23 relative to the annular support 22 to move the rolls 20 to discharge the ring 25 onto the conveyor 26. The spring 60 serves to normally hold the ring 23 and lever 59 in the position shown in Fig. 1.

The bending rolls 3, 4 and 5 each comprise specially constructed parts including the end gear sections 61 which are formed with cylindrical recesses 62 adapted to receive the bending cylinder or plug 63 with which the gear sections are adapted for assembly in adjustable relation. The set screws 64 extend through alined openings in both the gear and the bending cylinder 63 for securing the parts in any desired position of adjustment. In providing a bending roll having adjustable parts in the manner as described it is to be noted that in the bending of various thicknesses of materials which may be used that the gear sections 61 may be adjusted on the cylinder 63 in such a manner that the material being bent will be prevented from warping and twisting due to the fact that the opposed faces of the gear sections 61 may be brought into closed contact with the edges of the material being bent.

The pivot connection 38 may be adjusted for controlling the operation of the cutter bar and thereby control the number of convolutions or laminations built up in each ring within desired limits so that rings of different section may be made in the machine without alteration of the structure. The adjustment of screw 9 controlling the setting of roller 5 operates to form the desired size or diameter of ring.

It will be seen that a machine has been produced which will efficiently operate to form laminated rings or grommets of desired size and section.

What is claimed is:—

1. A machine of the class described comprising a table, a strip bending and feeding means mounted on the table, a supporting means mounted on the bottom of the table for receiving and supporting the bent strips, said supporting means having movable portions to permit the discharge of the bent strip, cutting means mounted on the table for cutting the strip, gauging means operable by the strip, and operating means for the cutting means controlled by the gauging means operable to cut the strip in a predetermined operation of the gauging means.

2. A machine of the class described comprising strip bending means, strip cutting means, operating mechanism for said strip cutting means, a clutch controlling the action of the operating mechanism, a clutch shifting roller engaged with the bent strip and shifted thereby as the bent strip builds up under the action of the strip bending means, and a system of levers between the clutch shifting roller and the clutch for controlling the clutch from the roller.

3. A machine of the class described comprising strip bending means, strip cutting means, operating mechanism for said strip cutting means, a clutch controlling the action of the operating mechanism, a clutch shifting member engaged with the bent strip and shifted thereby as the bent strip builds up under the action of the strip bending means and positive mechanical motion transmission means between the clutch shifting member and the clutch.

4. A machine of the class described comprising strip bending means, strip cutting means, operating mechanism for said strip cutting means including a shaft, a clutch controlling the drive of the shaft, means for actuating the cutting mechanism from the shaft, a clutch shifting roller engaged with the bent strip and shifted thereby as the bent strip builds up under the action of the strip bending means, and positive mechanical motion transmission means between the roller and the clutch.

5. A machine of the class described comprising strip bending means, a support for the bent strip built up by said strip bending means, said support comprising a plurality of shiftable supporting members positionable to support the strip and also positionable to discharge the strip after the same has been bent, strip cutting means, operating mechanism including a shaft, a clutch controlling the drive of the shaft, means for actuating the cutting mechanism from the shaft, means for shifting the shiftable supporting members from the shaft, a clutch shifting member engaged with the bent strip as it is built up on the support under the action of the strip bending means and motion transmission means between the clutch shifting member and the clutch.

6. A machine of the class described comprising strip bending means and a support for the bent strip built up under the action of the strip bending means and including a plurality of shiftable supporting members positionable to support the strip during the bending operation and also positionable to discharge the strip after it has been completely bent and formed.

7. A machine of the class described comprising strip bending means, a support for the bent strip formed by the action of the strip bending means and including a plurality of shiftable supporting members positionable to support the strip during the bending operation, cutting means for the strip, and automatic means for shifting the shiftable supporting members in synchronism with the operation of the cutting means.

8. A machine of the class described comprising strip bending means, a support for the bent strip formed by said means and comprising a plurality of shiftable supporting members positionable to support the strip during the bending operation and also positionable to discharge the strip after the same has been bent, operating mechanism including a shaft, a clutch controlling the drive of the shaft, means for shifting the supporting members from the shaft, a clutch shifting member engaged with the bent strip as it is formed on the support and motion transmission means between the clutch shifting member and the clutch.

9. A machine of the class described comprising strip bending means, a support for the bent strip formed by said means comprising a fixed ring, a plurality of supporting rollers pivoted on said ring and a shifting ring having pin and slot connections with said rollers.

In testimony whereof I hereunto affix my signature.

WILLIAM G. CORSON.